Oct. 31, 1961 A. H. W. BECK Re. 25,070

ELECTRON DISCHARGE DEVICES

Original Filed Aug. 1, 1950 3 Sheets-Sheet 1

Inventor
ARNOLD H. W. BECK

By Percy P. Lantzy
Attorney

ELECTRON DISCHARGE DEVICES

Original Filed Aug. 1, 1950 3 Sheets-Sheet 2

Inventor
ARNOLD H. W. BECK
By Percy P. Lantzy
Attorney

Oct. 31, 1961 A. H. W. BECK Re. 25,070

ELECTRON DISCHARGE DEVICES

Original Filed Aug. 1, 1950 3 Sheets-Sheet 3

Inventor
ARNOLD H. W. BECK

By Percy P. Lantzy
Attorney

United States Patent Office

Re. 25,070
Reissued Oct. 31, 1961

25,070

ELECTRON DISCHARGE DEVICES

Arnold H. W. Beck, Trumpington, Cambridge, England, assignor to International Standard Electric Corporation, New York, N.Y., a corporation of Delaware Original No. 2,829,299, dated Apr. 1, 1958, Ser. No. 176,925, Aug. 1, 1950. Application for reissue Aug. 28, 1959, Ser. No. 836,839
Claims priority, application Great Britain Aug. 12, 1949
7 Claims. (Cl. 315—3.5)

Matter enclosed in heavy brackets [ ] appears in the original patent but forms no part of this reissue specification; matter printed in italics indicates the additions made by reissue.

The present invention relates to electron beam arrangements where the beam current is limited by space charge and is particularly concerned with the focusing of electron beams through devices such as electron velocity modulation tubes where the maximum possible beam current is required.

In most devices utilising an electron beam, the design problem is that of forcing a beam through a tunnel without loss of electrons to the walls thereof. Heretofore, beam focusing arrangements have been either of the magnetic or of the electrostatic kind. In the case of electrostatic focusing, if we assume that we are able to set up electric fields which cause electrons emitted from a source, such as a thermionic cathode, to converge so as just to graze the entrance aperture of the tunnel, the mutual repulsion between the electrons in the field free space within the tunnel will cause their eventual divergence so that a throat is formed at which the electron beam has a minimum cross-section and the electrons are travelling substantially parallel to the axis of the tunnel. The profile of the beam is symmetrical to either side of the throat. The maximum current that can be forced through the tunnel without collection by the walls is such that the electron beam just grazes the entrance and exit apertures.

Thus, for any given input aperture and initial axial electron velocity there is a maximum current that can be projected through the tunnel without loss to the walls. This is true whatever the shape of the cross-section of the beam and also applies to systems having radial symmetry about a central cathode so as to produce a fan-shaped, radiating electron beam. For a circular tunnel of diameter d and length l it is known that $$I_{ES}=38.9\times10^{-6}V_0^{3/2}(d/l)^2 \qquad (1)$$

where $I_{ES}$ is the beam current measured in amperes and $V_0$ is the beam potential measured in volts. For a rectangular tunnel of cross-section a×b the present inventor has shown that the maximum current is given by $$I=83\times10^{-4}V_0^{3/2}ab/l^2 \qquad (2)$$

In the present specification we shall be concerned with an electron beam electrostatically focused to form a throat as described above, and the expression "electrostatic throat" is taken to indicate that transverse cross-section of an electrostatically focused beam in a field free tunnel at which the radial velocity components of the electrons are reduced substantially to zero, the beam having just grazed the input aperture of the tunnel. In the case of a cylindrical tunnel it is known that the diameter of the input aperture is 2.4 times the diameter of the throat.

If magnetic focusing be employed, the individual electrons travel in helical paths (assuming that at the entrance to the tunnel the beam is strictly parallel to the tunnel axis) and in theory, given a sufficiently strong magnetic field, the beam cross-section may be made to remain constant along any length of tunnel. In practice, there will be some electrons having outward radial velocity components due to such random causes as thermal agitation, with the result that a longitudinal cross-section of the beam is bounded by a pair of semi-cycloids and the magnetic field can be adjusted so that the beam has minimum transverse cross-sections at the entrance and exit apertures. The beam potential, however, or what amounts to the same thing, the axial velocity of the individual electrons, is not constant across any transverse cross-section of the beam but falls to a minimum at the center of the cross-section. If the potential falls to zero, i.e. the electrons at the center have zero axial velocity, we are left with a stationary space charge or virtual cathode. Any further attempt to force more electrons of the same initial axial velocities through the tunnel results in a denser charge formation without increase of the current issuing from the exit aperture of the tunnel. For most practical purposes, when the beam is to be used in an electron velocity modulation device, the potential fall on the axis must be limited to some 10%, and for this value of potential variation in a cylindrical tunnel using magnetic focusing, the maximum current that can be projected through the tunnel is given by $$I_m=6.26\times10^{-6}V_0^{3/2} \qquad (3)$$

It is to be noted that, provided the length of the tunnel is greater than its diameter, this maximum current is independent of the tunnel length; on the other hand the magnetic field required to prevent the beam from spreading is a function of the current.

In comparing electrostatic and magnetic focusing, we see that while in the former case, for a given tunnel diameter and beam voltage, the length of the tunnel is limited by the current which is to be passed through it, a convergent beam is required at the tunnel entrance. This means that we can employ a cathode of larger area than the tunnel cross-section with consequent reduction of cathode loading. With magnetic focusing, on the other hand, we are not restricted as to length of tunnel; but the beam must be parallel to the axis of the tunnel at its entrance—which implies that the cathode area must not be greater than that of the cross-section of the tunnel entrance. Hence, with magnetic focusing, for the same voltage and tunnel diameter we must have a higher cathode loading than in the electrostatic case.

The present invention combines electrostatic and magnetic focusing so as to enable a reduction in cathode loading by using a convergent beam for entry into the system, while allowing a tunnel to be used whose length is not dependent upon the current to be forced through it. Accordingly, the present invention provides an electron beam focusing arrangement adapted to focus a space-charge-limited current through a tunnel in which divergence of the beam is counteracted by means of an axial magnetic field, characterised in this, that the beam is electrostatically focused to converge from an electron source and to be substantially parallel to the axis of the tunnel at the entrance aperture thereof, the beam being substantially free from the influence of the said magnetic field prior to crossing the said entrance aperture. This last condition is essential if we wish to employ purely electrostatic means to guide the beam into the tunnel. The most direct way of ensuring this electromagnetic screening is to place the electrostatic focusing portion of the system within one of the pole pieces between which the magnetic field is set up.

The invention will be described with reference to the accompanying drawings in which.

Figure 1:
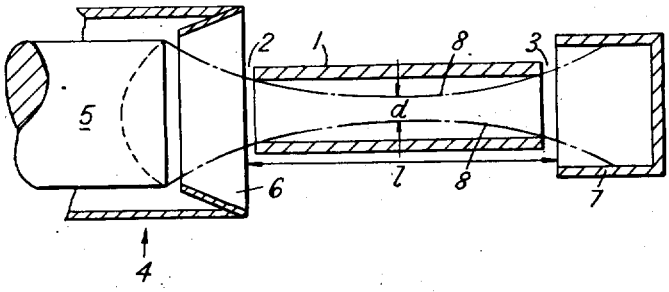
FIG. 1 illustrates diagrammatically, for purposes of explanation, the essential parts of a known electrostatic focusing system.

In FIG. 1 reference numeral 1 indicates a tunnel which may form, for example, a drift tube in an electron velocity modulation device between gaps 2 and 3 in which interaction between the beam and electromagnetic fields takes place. The beam is converged into the entrance of the tunnel by the electron gun 4, which is shown as comprising a cathode 5 and focusing cylinder 6. A collector electrode is indicated at 7. The profile of the electron beam is shown at 8 and narrows down to an electrostatic throat having a diameter d. It will be seen that the profile of the beam just grazes the entrance and exit apertures at the gaps 2 and 3. From Formula 1 quoted above, since we have here designated d as the diameter of the throat rather than that of the tunnel, the expression for the maximum current through the tunnel becomes $$I_E = 38.9 \times 10^{-6} V_0^{3/2} (2.4d/l)^2 \qquad (4)$$

Figure 2:
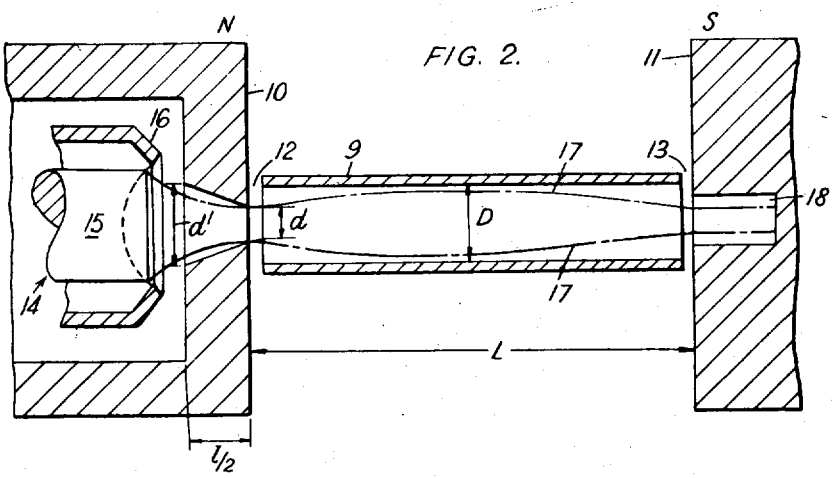
FIG. 2 represents diagrammatically an enlarged cross-sectional view of an electron beam focusing system according to the present invention.

In FIG. 2 the tunnel 9 of length L is shown positioned between two pole pieces 10 and 11, marked conventionally N and S respectively, leaving small gaps 12 and 13 for interaction purposes. Pole piece 10 is shown hollow and contains an electron gun 14 comprising cathode 15 and focusing electrode 16. The inner surface of pole piece 10 may conveniently be made to form the anode of the electron gun, and also to form an electrostatic tunnel of entrance diameter d′ so that the electron beam whose profile is indicated at 17 may form an electrostatic throat of diameter d at the gap 12. Since the space inside the electrostatic tunnel is substantially field free, the wall may conveniently be narrowed down from the diameter d′ to d without in any way altering the effect upon the beam. The electron gun 14 may be designed according to well known principles to provide the necessary converging current at the entrance of the electrostatic tunnel. The construction illustrated is probably the simplest method of obtaining a parallel beam at the gap 12, although special guns having shaded pole pieces could be designed for the same purpose. The thickness of the front wall of the pole piece 10 is 1/2, so that the pole piece forms one half of an electrostatic tunnel such as shown in FIG. 1. The pole piece 11 may conveniently contain a recess 18 in which the electrons are finally collected. The diameter D of tunnel 9 is shown larger than that of the entrance aperture diameter d in order to allow for the divergence of electrons which have small radial velocities at the entrance aperture, as discussed above in connection with magnetic focusing. In an electron velocity modulation device the length L and the width of the beam at the gaps 12 and 13 are determined by the requirements of the tube, the diameter d, in particular, being determined by the gap modulation coefficient required (i.e. the factor usually designated by $\beta$). In a system in which L is 5 cm. and d 1.8 mm., the diameter D would be about 2.5 mm.

As an example of a design of a beam system according to the present invention and for comparison with pure electrostatic or magnetic focusing arrangement, let us assume that we wish to limit the beam voltage to 1000 volts. From Equation 4, in the electrostatic case we find that the maximum current that can be forced through a tunnel of 5 centimeters length is 9.2 ma. In the magnetic case, allowing for a 10% fall in potential in the beam, we find, from Equation 3, that the maximum current is 197 ma. Thus the eleectromagnetic focusing gives a very much higher current but the cathode loading for such a current would be prohibitive, since, assuming a cathode diameter of 2.5 mm. (equal to the main tunnel) it would be at least 4 a./cm.$^2$. Actually the cathode would have to be a little smaller than this, with a corresponding increase in current.

With the present invention, using the arrangement of FIG. 2, we may retain our 197 ma. but reduce the cathode loading. To the left of the gap 12 we have electrostatic focusing and to right magnetic. For continuity of current we equate $I_M$ and $I_E$ in Equations 3 and 4 and so obtain the required length of electrostatic tunnel to produce a parallel beam at the gap 12. One half of the electrostatic tunnel is required. For the dimensions previously given, with 1000 volts beam potential, we find that the pole piece width 1/2 is approximately 5.4 mm. It remains to design a suitable electrostatic electron gun, according to known principles with which the present invention is not concerned, which will project about 200 ma. current at 1000 volts into the tunnel aperture. By way of exemplifying the decrease in cathode loading it is known that for an optimised arrangement of a gun designed according to the principles disclosed by J. R. Pierce, commonly known as a Pierce gun, the current density at the electrostatic throat is approximately 25.5 times that at the cathode. Using the figures in the above example the current density at the throat is about 8 a./cm.$^2$, so that the cathode loading would only be about 0.32 a./cm.$^2$ which is well within the handling capacities of modern oxide-coated cathodes. If we assume 1 a./cm.$^2$ as a reasonable maximum cathode loading it is clear that current densities of 25.5 a./cm.$^2$ can be obtained in the working part of the beam. The Pierce gun is used as an example because it is readily amenable to theoretical treatment. Other guns can be used equally or more effectively and there is no reason to assume that 25.5 is the maximum ratio of cathode area to throat area which can be obtained.

Figure 3:
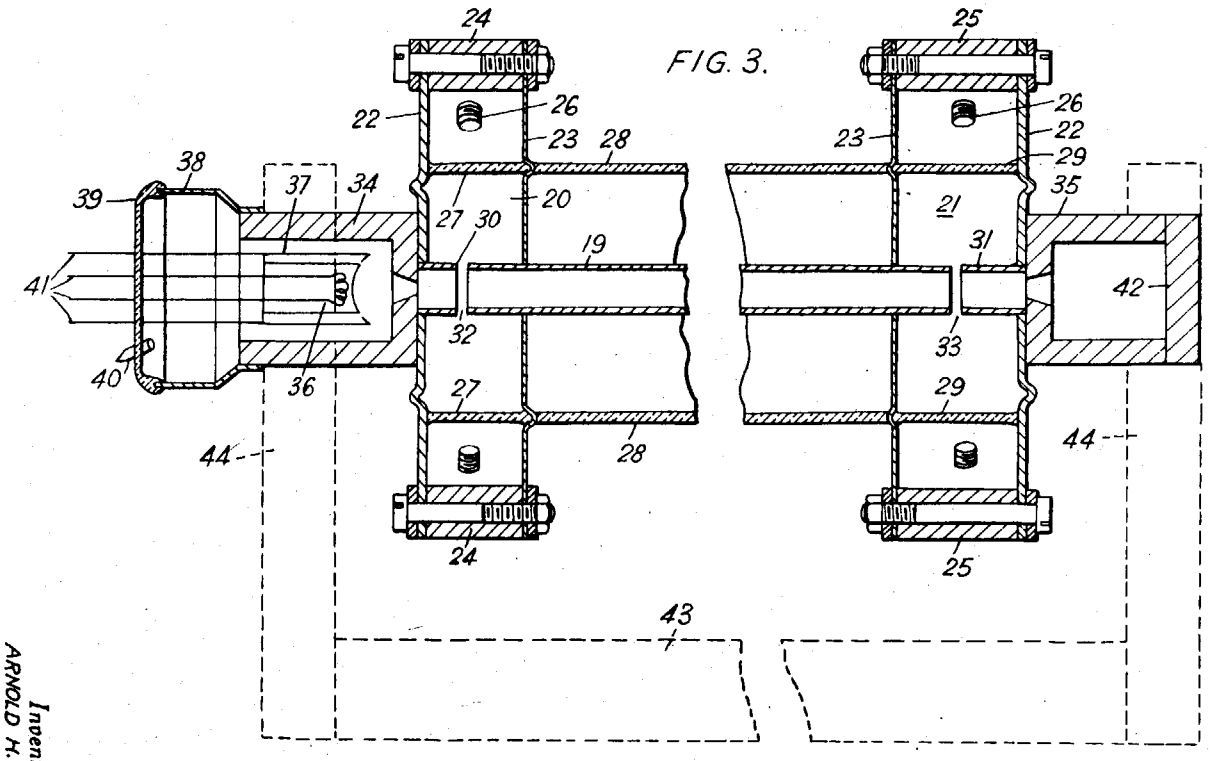
FIG. 3 shows a longitudinal cross-section in part diagrammatic, of an embodiment of the invention in an electron velocity modulation device.

In the embodiment of FIG. 3, the invention is shown applied to a two resonator klystron. The tunnel 9 of FIG. 2 is replaced by a drift tube 19, separating two resonant cavities 20 and 21. These cavities are formed between pairs of metal discs 22 and 23, the disc 22 forming the outer wall being made of nickel-iron alloy having substantially the same coefficient of expansion as glass, such as that sold under the registered trademark "Cinseal," while the disc 23 may be of copper. The discs are clamped to annular metal collars 24 and 25 which may be provided with tuning screws 26 for adjusting the resonant frequency of the cavities 20 and 21. Glass sleeves 27, 28 and 29 are sealed between the respective discs as shown to form an envelope for the device. Tubular extension members 30 and 31 secured to the respective plates 22 are aligned with the drift tube 19 and form continuations thereof leaving gaps 32 and 33 in which interaction between the electron beam and the electromagnetic field in the respective cavities, 20 and 21 may occur. Hollow pole pieces 34 and 35, corresponding to the pole pieces 10 and 11 of FIG. 2, are secured to the respective plates 22 at either end of the device. The pole piece 34 houses an indirectly heated cathode 36 and a focusing cylinder 37, which components are shown diagrammatically on the drawing. The hermetic enclosure of the pole piece 34 is completed by an alloy skirt 38 sealed to the material of the pole piece and to a glass base 39 carrying an exhaust tubulation 40 and leads 41 for the electron gun electrodes. Pole piece 35 is closed by an end plate 42 which forms the collector electrode for the electrons projected through the device. The magnetic circuit is completed by means of a permanent magnet or solenoid indicated at 43 and coupled by means of yoke arms 44 to the respective pole pieces. The dimensioning and operation of the device will be evident to those skilled in the art from the foregoing discussion with reference to FIG. 2. It is important to note however, that the pole piece 34 must be of sufficient thickness to provide adequate magnetic screening for the electron gun.

Figure 4:
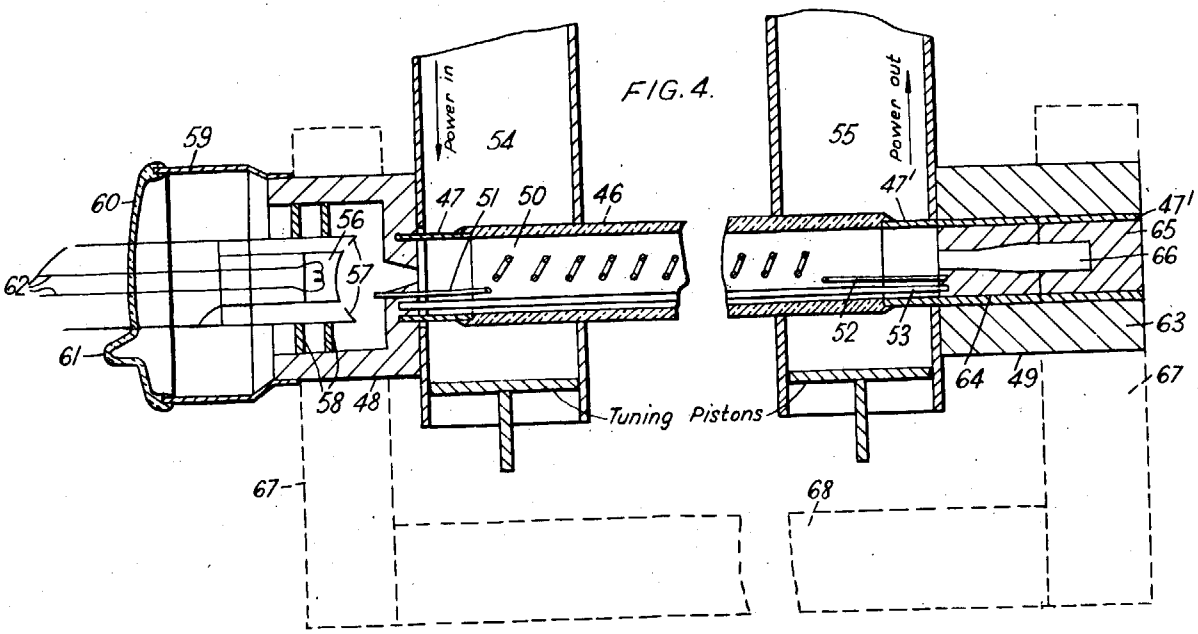
FIG. 4 shows a longitudinal cross-section in part diagrammatic, of another embodiment.

In the embodying of FIG. 4, the invention is shown as applied to a travelling wave tube. The tube comprises a glass sleeve 46 which is sealed by short "Cinseal" cylinders 47 to the pole pieces 48 and 49. A helix 50, terminating in pick-up posts or probes 51 and 52 secured to the pole pieces, is positioned in the sleeve 46 by means of quartz suport rods 53 which are located in the pole piece and faces. The travelling wave tube projects at either end through rectangular wave guides indicated at 54 and 55.

The pole piece 48 houses an electrostatic gun comprising an indirectly heated cathode and focussing cylinder shown diagrammatically at 56 and 57 respectively, these members being located by mica washers 58. As in the previous example, the pole piece 48 is closed by means of an alloy spinning 59 sealed to a glass base 60 carrying an exhaust tubulation 61 and electrode leads 62. At the other end of the tube the pole piece 49 comprises a cylindrical member 63 in which iron or "Cinseal" blocks 64 and 65 may be brazed, these blocks being hollowed out to provide a chamber 66 the walls of which constitute the electron collector electrode.

As in FIG. 2 the magnetic circuit is completed by yoke arms 67 and a permanent magnet or solenoid 68.

While the principles of the invention have been described above in connection with specific embodiments, and particular modifications thereof, it is to be clearly understood that this description is made only by way of example and not as a limitation on the scope of the invention. In particular the same principles may be used to obtain rectangular cross-section beam of high current density, if cylindrical lenses are substituted for the spherical lenses discussed above.

What I claim is:

1. An electron discharge device having an electron beam source, a tunnel member for the flow of an electron beam therethrough, and means to provide a magnetic field coaxially of said tunnel member to minimize divergence of said beam within said tunnel member, said beam source comprising an electron emitter of materially greater cross-sectional area than that of said tunnel member, electrostatic focussing means to converge the electrons from said emitter into a beam of a cross-sectional area to enter into said tunnel member for substantially parallel flow at the entrance thereof, and a shield of magnetic material for shielding said beam from influence by said magnetic field prior to entrance into said tunnel member.

2. An electron discharge device according to claim 1, wherein the means for producing said magnetic field includes a pair of pole pieces at opposite ends of said tunnel and said electrostatic focusing means is contained within one of the pole pieces.

3. An electron discharge device according to claim 2, wherein said one pole piece is hollow and has an aperture forming a second tunnel member adjacent the entrace and coaxially of the aforementioned tunnel member, said second tunnel member constituting said electrostatic focusing electrode for said beam and the end of said one pole piece adjacent said second tunnel member forming said magnetic shielding means.

4. An electron discharge device according to claim 3, further including a pair of cavity resonators, one adjacent each pole piece and in communication with the ends of said first tunnel member.

5. An electron discharge device according to claim 3, further including a pair of wave guides one adjacent each pole piece and in communication with the ends of said first tunnel member, and wherein the means defining said first tunnel member includes a helical wave conductor.

*6. An electron discharge device having an electron beam source, a tunnel member for the flow of an electron beam therethrough, said beam source comprising an electron emitter, said tunnel member at no point having a greater cross-section than that of said electron emitter, means to focus said electron beam into a beam of given diameter, means to provide a magnetic field at a given distance from said source to maintain said given beam diameter constant, and means to shield said source from influence of said magnetic field surrounding at least a portion of said beam in the region of said source.*

*7. An electron discharge device having an electron beam source, a tunnel member for the flow of an electron beam therethrough, said beam source comprising an electron emitter, said tunnel having a uniform cross-section less than that of said electron emitter, means to focus an electron beam into a beam of given diameter prior to entrance into said tunnel member, means to provide a magnetic field at a given distance from said source to minimize divergence of said electron beam, and means to shield said source from influence of said magnetic field surrounding at least a portion of said beam of said source.*

References Cited in the file of this patent or the original patent

UNITED STATES PATENTS

| | | |
|---|---|---|
| 2,225,447 | Haeff et al. | Dec. 17, 1940 |
| 2,300,052 | Lindenblad | Oct. 27, 1942 |
| 2,305,884 | Litton | Dec. 22, 1942 |
| 2,376,707 | McCoy | May 2, 1945 |
| 2,516,944 | Barnett | Aug. 1, 1950 |
| 2,524,252 | Brown | Oct. 3, 1950 |
| 2,567,674 | Linder | Sept. 11, 1951 |
| 2,579,654 | Derby | Dec. 25, 1951 |
| 2,591,350 | Gorn | Apr. 1, 1952 |
| 2,608,668 | Hines | Aug. 26, 1952 |